Oct. 24, 1967 L. DONADIEU 3,349,169

SUPERCONDUCTING CABLE

Filed Jan. 28, 1966 2 Sheets-Sheet 1

INVENTOR
LUCIEN DONADIEU
BY Paul M. Craig, Jr.
ATTORNEY

Oct. 24, 1967 L. DONADIEU 3,349,169

SUPERCONDUCTING CABLE

Filed Jan. 28, 1966

INVENTOR
LUCIEN DONADIEU
BY Paul M. Craig, Jr.
ATTORNEY

United States Patent Office 3,349,169

Patented Oct. 24, 1967

3,349,169

SUPERCONDUCTING CABLE

Lucien Donadieu, Sevres, France, assignor to Compagnie Generale d'Electricite, Paris, France, a corporation of France Filed Jan. 28, 1966, Ser. No. 523,770
Claims priority, application France, Aug. 3, 1965, 27,069
10 Claims. (Cl. 174—128)

ABSTRACT OF THE DISCLOSURE

An electric cable having a central superconducting conductor and at least one helical or braided sheath of conductive material covering said central conductor.

The present invention relates to electrical cables working at very low temperature. More particularly the present invention relates to superconducting cables for use in high field superconducting coils for installations such as magnetohydrodynamic electrical generators, bubble chambers, etc.

It is well known that, at a given temperature, a superconducting material looses its particular properties and behaves as a material having a conductivity of the normal type if the current flowing therethrough passes over a critical intensity $I_L$. The value of the critical current depends upon the flux density to which the material is subjected, and it is possible to obtain experimental curves representing $I_L$ as a function of the flux density B. Such a curve is represented in plain line in FIGURE 1 of the accompanying drawings.

It has been found that, in the case of a coil made of a superconducting wire, the current cannot pass over a certain maximum value $I_M$ which is substantially smaller than the theoretical value $I_L$ of the curve of FIGURE 1. The variation of the value $I_M$, as a function of the flux density B, is approximately represented by the curve in dotted line of FIGURE 1. The difference between the curves $I_L$ and $I_M$ is due to the fact that superconducting materials may present internal electromagnetic perturbations which may cause the vanishing of the property of superconductivity, which effect is sometimes called "quenching." The internal perturbations are caused by several factors, among which are local heating and action of the external magnetic field, including that produced by the conductor itself and adjacent turns of this conductor.

This leads to a subsequent limitation of the maximum current to values much lower than theoretical values, and consequently to a limitation of the magnetic field of the coil.

The current $I_M$ may be increased by having the winding of the coils made not only of superconducting wires but of composite cables including one or several conductors made of material presenting a good conductivity of normal type. To this end it has been proposed to insert superconducting wires in one or several grooves disposed in the outer surface of a tape made of copper. Another conventional cable has been made of stranded wires of which one or more are made of copper, the others of superconducting material.

The above mentioned proposed solutions make it possible to increase substantially the electrical stability of the cable but the increase of the critical current $I_M$ is rather slight. For a given use of a cable having the form of the above mentioned tape, the determination of the optimum quantity of copper is quite easy, but such a cable is not suitable for coils owing to the relative fragility of the tapes made of copper. Whatever the conventional solution is, one disadvantage remains: the cable, once produced, can be used for only a fixed optimum current.

The object of the present invention is to provide a superconducting cable having a high electrical stability despite possible localized internal electromagnetic perturbations.

Another object of the invention is the provision of a cable capable of conducting a current for which the maximum intensity is close to the theoretical maximum intensity.

Still another object of the invention is to provide a superconducting cable that may be easily and almost instantly adapted for various working conditions.

A further object of the present invention is to provide a cable which is easy to wind.

Another object of the present invention is to provide a cable presenting a high electrical stability when subjected to external electromagnetic perturbations.

Another object of the present invention is the provision of a cable having a high mechanical strength, capable of being handled without any particular care. Finally an object of the invention is to provide a cable capable of being adapted to various working conditions without expensive transformation and without any work done on the part of the cable made of superconducting material.

The invention will now be described with reference to the accompanying drawings illustrating several possible embodiments where:

Figure 1:
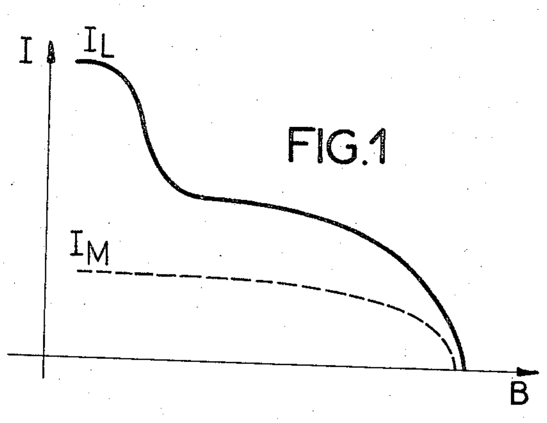
FIGURE 1 represents the curves $I_L$ and $I_M$ as functions of the flux density B.

As mentioned above, FIGURE 1 represents the theoretical curve of the critical current $I_L$ of a superconducting material, and experimental curve of the maximum current $I_M$ of a wound wire made of the same material, as functions of the flux density.

Figure 2:
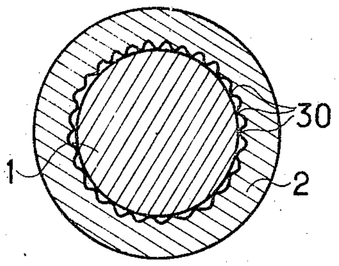
FIGURE 2 is a schematic section view of a cable according to the invention.

FIGURE 2 is a schematic cross-section of a cable having, according to the invention, a central part made of a material which is superconducting at low temperature and an outer sheath made of a metal having a good electrical conductivity at normal temperature (at least $2.10^7$ mho/m.), the ratio of the conductivity at low temperatures of a few degrees K. to the conductivity at normal temperature, 20° C. for example, being higher than 50.

For example, this metal may be selected of the group consisting of gold, silver, copper and aluminum. The sheath is manufactured so that it has a great number of contact points with the central part of the cable without being in continuous contact therewith, such contact points being shown by the reference numeral 30 of FIGURE 1.

The ideal case would be that of a sheath 2 having a perfect and continuous electrical contact with the central part of the cable along its whole surface but such a cable, if its production was possible, would have no flexibility. However, for particular use, it is possible to manufacture a cable already having the desired curvature, for example for a coil of great dimension consisting in an assembly of pre-constructed turns.

A great number of contact points between the superconducting central part and the sheath allows the current flowing in the superconducting part to by-pass, through the metal of the sheath, any portion of the central part where internal microscopic electromagnetic perturbations result in a local vanishing of the superconductivity.

The "quenching" effect thus remains localized and does not propagate since there is no local heating due to current flowing through the perturbed portion where the conductivity increases suddenly.

Figures 3, 4:
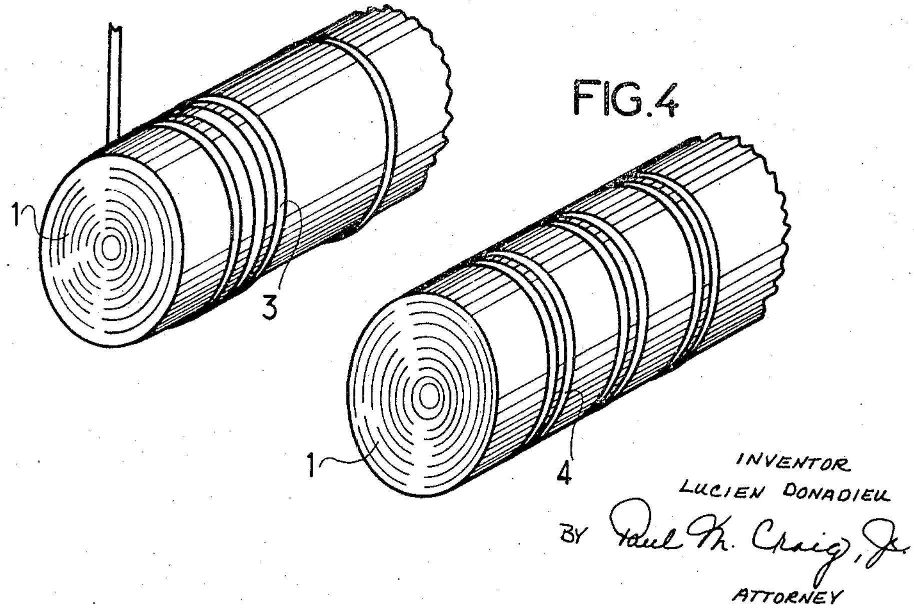
FIGURES 3, 4 and 5 show other cables according to the invention.

FIGURE 3 is a schematic representation of an embodiment of the invention: the central part 1 made of superconducting material is surrounded by a sheath 3 obtained by winding a tape made of a metal of the group defined above. Preferably the turns of the tape are adjacent to each other so as to increase the number of contact points with the central conductor. While providing a good electrical contact, the helical tape also permits a good flexibility, which is important for the manufacture of coils.

FIGURE 4 represents another embodiment of the invention. According to this embodiment the central conductor 1 is covered by a sheath formed by helically wound bundles of thin wires made of a metal of the group defined above.

Figure 5:
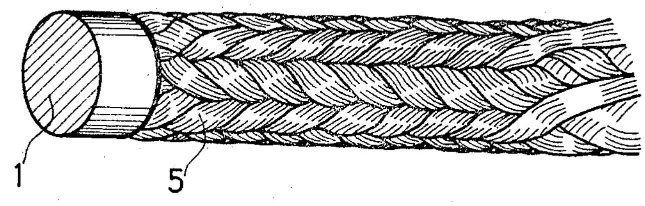

FIGURE 5 is a representation of a still another embodiment of the present invention.

In this embodiment a central superconducting element 1 is covered by a sheath 5 including a plurality of braided wires made of the same metal as defined above. The braided sheath may be formed by identical wires or by braiding single wires with composite wires formed either by braiding or by stranding of a plurality of wire.

The number of wires used, their cross-section and the kind of braiding are chosen according to the desired characteristics of the cable to be obtained. In particular the quantity of metal to be used determines the maximum stable current which will be sustained by the cable. The kind of braiding has an influence on the number of the contact points to be obtained with the central conductor and also on the flexibility of the cable. Thus a great number of contact points obtained without diminishing greatly the flexibility make possible very easy winding and unwinding. On the other hand the braiding of the sheath can be easily carried out on any pre-manufactured superconducting conductor, and the tightening of the sheath can be adjusted at a desired value. It has been found that the maximum current which can flow, with good conditions of stability, through a winding made of a cable according to the invention, is much greater than the maximum current of any conventional construction and very much greater than the current of a cable having no means for avoiding the "quenching" effect.

For example, a superconducting wire of 1 millimeter of cross-section having no sheath presents a maximum stable current of 84 amperes. The same wire covered by a sheath comprising a braid of 16 groups of 3 wires made of tinned copper having a cross-section of 12/100 of millimeter would let pass a maximum current of 260 amperes, that is three times higher.

The maximum current may be still increased by addition of a second sheath, which can be easily manufactured, on a cable already having a first sheath. For example the addition of a second braided sheath having 16 groups of 4 wires of the same type increases the value of maximum stable current up to some 510 amperes, that is about twice as high. Further addition of sheaths leads to approaching the theoretical value of the critical current as defined by the upper curve of FIGURE 1.

Figure 6:
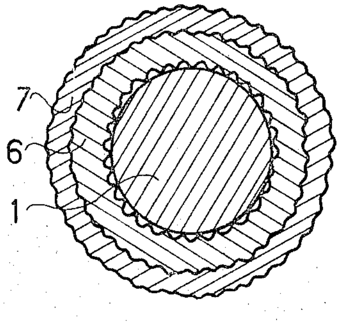
FIGURES 6 and 7 are schematic sections of other embodiments of the invention.

FIGURE 6 shows a composite cable according to the present invention. In this embodiment the cable comprises a central superconducting part 1, covered by a first sheath 6 as disclosed above and a second sheath 7. The latter sheath is manufactured according to the principle described above but the braided wires are made of a metal having good ferro-magnetic properties, such as iron, nickel, iron-nickel alloys, etc.

Compared to the cables described abve the cable according to FIGURE 6 presents the additional advantage of being unaffected by a variation of an external magnetic field which may be one of the causes creating the abovementioned internal perturbations resulting in the "quenching" effect.

Figure 7:
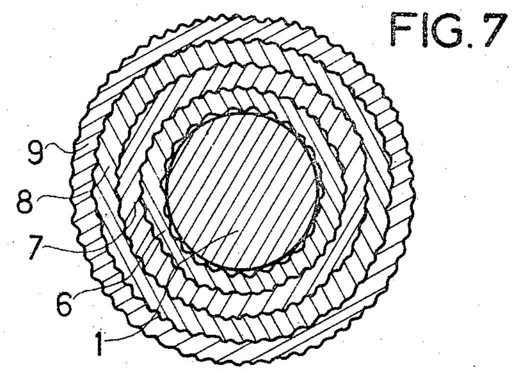

FIGURE 7 is a representation of another cable according to the invention: this cable, similar to that of FIGURE 6, comprises a further sheath 8 covering sheath 7 and made of an insulating material. As illustrated in FIGURE 7 the cable of the invention may comprise an outer braided sheath such as sheath 9 but of wires made of a metal having good resilience and high mechanical strength, such as iron or steel. An outer sheath having good resilience and high mechanical strength presents many advantages in case of a cable for use in very high field windings: the resilience of the composite cable permits easy winding while great mechanical strength is necessary for resisting to the great electromechanical forces applied to the turns of a coil traversed by very high currents. In addition a sheath such as sheath 9 gives a good mechanical protection to the inner sheaths and the central conductor.

It has to be noted that the provision of several sheaths does not produce the same effect as the provision of a single sheath having an equivalent quantity of metal. Provision of several successive sheaths has the advantage of keeping the flexibility at a maximum value and permits an easy adaptation of any cable to desired conditions of use. Furthermore, as for a coil wherein the pressure of inner turns against the spool increases when additional external turns are wound, the pressure of a first braided sheath against the superconducting central wire increases by addition of supplementary braided sheaths, whether the latter are made of the same metal or whether they are made of ferromagnetic materials or of materials having good mechanical properties. It is to be understood that in a cable having several sheaths, two successive sheaths may be made of different metals selected of the group of metals having good electrical properties as defined above.

The central superconducting part of a cable according to the invention is not necessarily made of a single wire. Usually the central part is made of several stranded wires made of a superconducting material; these stranded superconducting wires may be further impregnated with a malleable metal having a low melting temperature, such as lead, tin, indium, bismuth or an alloy of any of them. These metals do not adversely affect the flexibility of the cable and it may be advantageous to have the superconducting wire covered with a thin external layer so that, owing to its low mechanical resistance, the wires of the braided sheath are impressed therein, thus improving the electrical contact. Furthermore one or more braided sheaths may be impregnated with these metals, thus increasing the overall electrical conductivity.

As mentioned above, the wires of the sheaths are made of a metal having good electrical conductivity at normal temperature of 20° C., metal such as copper, silver, aluminium or gold. In certain cases the wire may include a central conductor made of one of these metals, for example copper, and a thin coating made of another metal, for example, gold, tin or silver, or even another metal of those having a low melting temperature.

What I claim is:

1. An electric cable comprising a central conductor at least partially made of a superconducting metal and at least one sheath covering said central conductor and having with the latter a great number of electrical contact points per unit of area, said sheath being made of a metal having at normal temperature an electrical conductivity higher than $2.10^7$ mho/m. and having a ratio of the conductivity at a temperature of a few Kelvin degrees to the conductivity at normal ambient temperatures higher than 50, said sheath being formed of a plurality of braided wires, the metal of said sheath being selected from the group consisting of gold, copper, aluminum and silver.

2. An electric cable according to claim 1 wherein each wire of said sheath has a superficial coating made of a metal selected from the group consisting of tin, silver and gold.

3. An electric cable according to claim 1, wherein said sheath formed by a plurality of braided wires is impregnated with a malleable metal, having good thermal and electrical conductivities and a low melting temperature.

4. An electric cable according to claim 3, wherein said malleable metal is a metal selected from the group consisting of indium, tin, bismuth and lead.

5. An electric cable according to claim 1, wherein said sheath is impregnated with an alloy of at least two metals selected from the group consisting of indium, tin, bismuth and lead.

6. An electric cable according to claim 1 wherein said braided sheath comprises a plurality of conductors including conductors made of several braided wires.

7. An electric cable according to claim 1 further including an additional sheath of braided conductors superimposed upon the sheath covering said central conductor.

8. An electric cable according to claim 7 wherein said additional sheath of braided conductors is made from a metal having good ferromagnetic properties.

9. An electric cable according to claim 7 wherein a third sheath of insulating material covers said additional sheath of braided conductors and a fourth sheath of braided conductors having a good resilience and a great mechanical strength covering said third sheath.

10. An electric cable comprising a central conductor at least partially made of a superconducting metal and at least one sheath covering said central conductor and having with the latter a great number of electrical contact points per unit of area, said sheath being made of a metal having at normal temperature an electrical conductivity higher than $2.10^7$ mho/m. and having a ratio of the conductivity at a temperature of a few Kelvin degrees to the conductivity at normal ambient temperature higher than 50, said sheath being formed of a helically wound conductive band, the metal of said sheath being selected from the group consisting of gold, copper, aluminum and silver.

References Cited

UNITED STATES PATENTS

| | | | |
|---|---|---|---|
| 112,137 | 2/1871 | Fricke | 174—128 |
| 283,764 | 8/1883 | Delany | 174—126 |
| 1,804,732 | 5/1931 | Alden | 174—128 |
| 2,938,943 | 5/1960 | Horn | 174—102 |
| 3,109,963 | 11/1963 | Geballe | 335—216 |
| 3,218,693 | 11/1965 | Allen. | |
| 3,265,939 | 8/1966 | Rinderer | 335—216 |

FOREIGN PATENTS

| | | |
|---|---|---|
| 7,791 | 4/1909 | Great Britain. |

LARAMIE E. ASKIN, *Primary Examiner.*

E. GOLDBERG, *Assistant Examiner.*